T867006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 748

796,226
METHOD OF SPLICING SENSITIVE PHOTOGRAPHIC MATERIALS

Oliver W. Kaul, 1669 Lake Ave., Rochester, N.Y. 14650

Filed Feb. 3, 1969. Published Oct. 21, 1969
Int. Cl. B65h *69/02*
U.S. Cl. 156—157
No Drawing. 13 Pages Specification

Sensitive photographic sheet materials, such as photographic film or paper, are spliced together with a splicing tape having an activated surface by contacting the emulsion surface of the photographic material with the activated surface of the tape and applying heat and pressure sufficient to obtain a strong bond. The splicing tape is comprised of a flexible support, such as paper, cloth or a polymeric film, coated with a thin layer of a polyolefin, such as polyethylene or polypropylene, which has been surface activated by, for example, flame treatment, chemical oxidation or electron bombardment.

Low density polyethylene is the preferred polyolefin and the thickness of the polyolefin layer is typically in the range of from about 0.1 to about 3 mils. The support can vary in thickness from about 1 mil to about 8 mils. A preferred support material is oriented polyethylene terephthalate film with a thickness of from about 1 to about 3 mils. In effecting splicing, heat and pressure are applied for a sufficient period of time to effect bonding, typical times being from about 1 to about 5 seconds.

The splicing tape is particularly advantageous for use in joining together separate lengths of photographic material to form a continuous web adapted to processing by continuous machine methods.